June 24, 1969  A. M. MARKS  3,451,742
MULTIPLE IRIS RASTER
Filed July 25, 1966
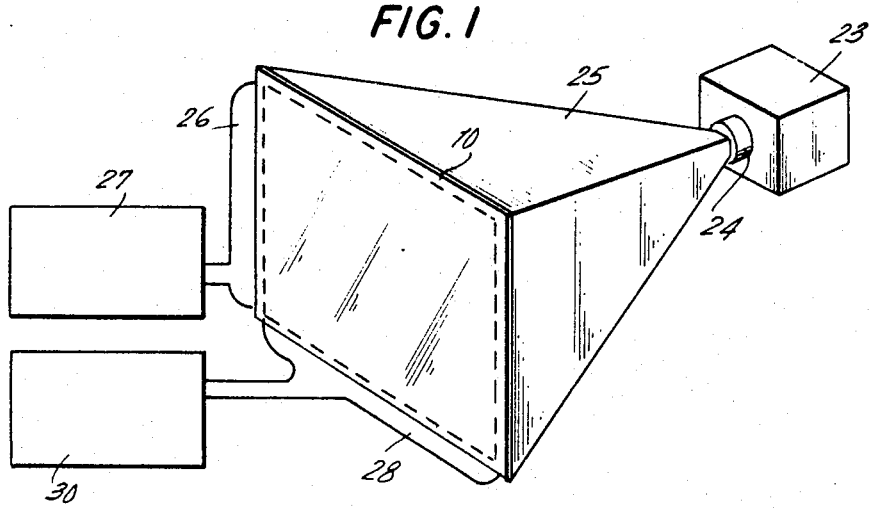
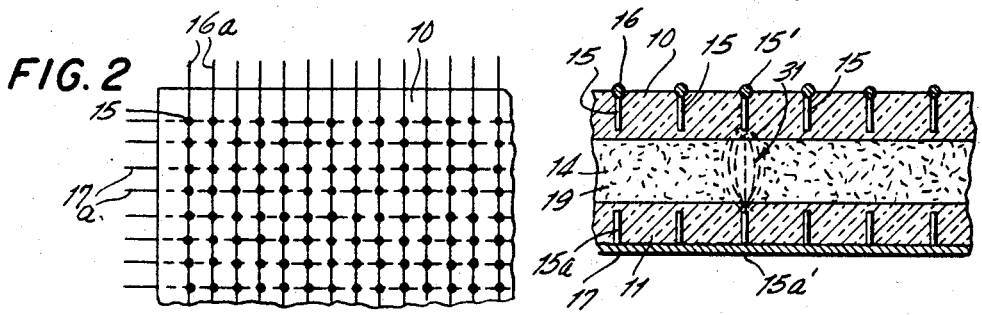
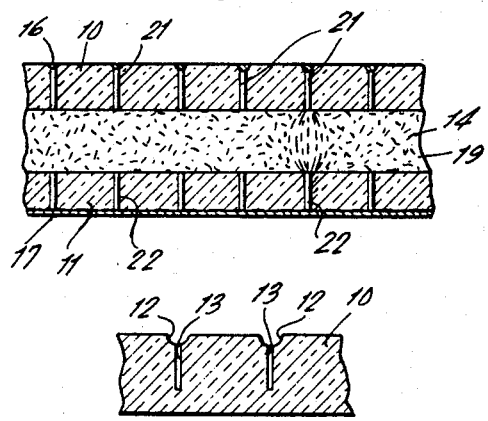
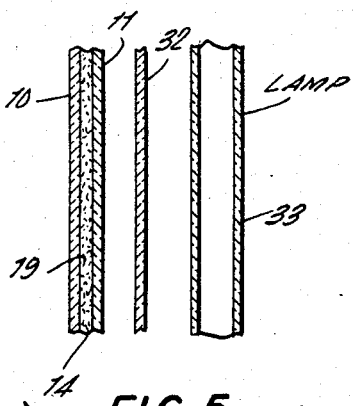
INVENTOR.
ALVIN M. MARKS
BY Albert H. Kronman
ATTORNEY 3,451,742
MULTIPLE IRIS RASTER
Alvin M. Marks, 153—16 10th Ave.,
Whitestone, N.Y. 11357
Filed July 25, 1966, Ser. No. 567,456
Int. Cl. G02f 1/36
U.S. Cl. 350—160         12 Claims This invention relates to a multiple iris raster for selectively showing transmitted light in desired areas. The invention has particular reference to an electrostatic control means for changing the amount of light transmitted or reflected through any one of a large number of small areas in a viewing screen.

The present invention comprises an improvement in an electrostatic fluid cell which includes a large number of minute dipoles. It has been known that an electrostatic field applied to a plurality of dipoles suspended in a thin layer of nonconductive liquid produces a rotation of the dipoles and causes them to align their lengths with the direction of the electric field. Prior attempts of forming a control means for the transmission of light have not produced good results because the application of the electric field generally covered too much area and was not well defined. The present invention employs a plurality of equally spaced crossed electrodes and a plurality of conductive pins which extend into the plates forming the cell and thereby produce an electric field which is well defined and considerably more intense than prior art structures.

To produce a maximum change of light transmission, the dipoles are probably of a length which is about one-third to one-half the wavelength of the incident light. Also, the dipole particles must have a width and thickness which is less than one-tenth of the wavelength of the incident light. Dipoles may be made of crystals such as Herapathite or metal crystals, which have a natural elongated shape. While larger dimensions may be used, these are generally not to be preferred since the smaller particles are of the dimensions above to make them react to light and respond rotationally as quickly as possible to the electric field and to Brownian motion. Larger particles may be used in slow-speed scansions.

A minimum critical field intensity must be applied before any substantial alignment of the dipoles is accomplished. When the field intensity is less than critical, the Brownian motion of the molecules in the liquid is sufficient to provide a statistical random position of the dipoles. When the applied field intensity is greater than critical, partial alignment of the dipole occurs. When the critical voltage is applied between point electrodes on each side of the dipole area, only a small area of the liquid is aligned along the axis of the point electrodes. As the voltage between the point electrodes increases, a circle of greater area is subjected to alignment because the electric field intensity now exceeds critical in a larger area or spot. This characteristic can be used to modulate the light transmitted through the liquid dipole layer both as to spot area, spot position and spot intensity.

A step voltage or single square wave causes a momentary alignment of dipoles. During the application of a steady potential difference, the dipoles, however, quickly disalign. The disalignment of the dipoles is due to the migration of ions toward the negative electrode, which thereby produces a shielding field at the surfaces of the dipole layer. A double electrical layer also tends to form at the ends of the dipoles as they are aligning.

When an alternating electric field is applied, its half period should be less than the relaxation time of the dipole particle. If the half period is of the order of the relaxation time, the dipoles tend to disalign during the time the electric field intensity is going through zero. Such alternate alignment and disalignment may produce turbulence in the suspension, dissipate energy, and result in a poor average alignment.

The aligning field is, therefore, preferably of the order of 0.1 to 10 megacycles.

There is a minimum critical aligning electric field intensity. At room temperature the value of $kT$ in the Boltzman equation equals 0.055 electron volt, where $k$ is the Boltzman constant and T is the absolute temperature in degrees Kelvin. This is the average energy possessed per molecule particle impact due to Brownian motion. These Brownian impacts are statistically random in energy and direction and tend to turn the dipole particles into random positions.

The dipole rotating in an electric field obtains rotational energy from the field which counteracts the rotational kinetic energy imparted to it by random molecular impacts. The electric field intensity which aligns the dipole in the direction of the electric field provide rotational energy to the dipole particle which exceeds the random molecular impact energy tending to disalign the particles.

One of the objects of the present invention is to provide an improved multiple iris raster which overcomes one or more of the disadvantages and limitations of prior art arrangements.

Another object of the present invention is to provide a light control means which operates to change the light transmittance and/or reflectance of an element of area with a response time of the order of a microsecond.

Another object of the present invention is a large, flat display panel, particularly for television.

Still another object of the present invention is to display digital and symbolic results which may be derived from a computer.

A further object of the present invention is to modulate the light transmittance, reflectance or absorbance of a dipole panel by the application of electrostatic fields of variable intensity, area and position.

The invention is a multiple iris raster. It includes a first transparent nonconductive plate which forms one boundary of the raster. A second transparent plate, spaced from the first, forms the other boundary. A nonconductive transparent fluid is confined between the first and second plates and a plurality of dipoles are suspended in the fluid. These dipoles have a length which is between one-third to one-half a micron and a diameter which is less than one-tenth of its length. A plurality of spaced parallel conductive electrodes are secured to or embedded in the outer surface of the first plate with means for connection to a second external circuit. Another plurality of spaced parallel conductive electrodes are similarly carried by the second plate with means for connection to a second external circuit. In most cases the first conductive electrodes are arranged at right angles to the second conductive electrodes. To increase the field intensity and to localize the electric field, a plurality of spaced, small pins are secured in both the first and second plates and normally disposed to the major surface thereof. These pins are connected to the conductive electrodes. Each of the pins on the first plate are axially aligned with a pin on the second plate. This raster is controlled by the voltages supplied to the electrodes by the external circuits.

In the accompanying drawings, forming a part hereof, there is illustrated two forms of embodiment of the invention, in which drawings similar reference characters designate corresponding parts, and in which:

FIGURE 1 is an isometric view showing the raster, external illumination means, and two controlling circuits (shown in block) which apply voltages to the raster electrodes.

FIGURE 2 is a plan view of a portion of the raster.

FIGURE 3 is a cross sectional view on an enlarged scale showing a portion of the raster with details of the pins, the electrodes, the electrostatic field, and the dipoles.

FIGURE 4 is a cross sectional view similar to FIGURE 3 but showing the pins penetrating the first and second transparent plates to create a more intense electric field.

FIGURE 5 is a cross sectional view of another arrangement showing the raster, a ground glass plate, and an illumination means behind the ground plate which may be a gaseous discharge device.

FIGURE 6 is another cross sectional fragmentary view of one of the plates indicating the construction and method of forming the plates prior to positioning the conductive electrodes and the pins.

Referring now to the figures, the raster includes two spaced parallel plates 10 and 11, shown in detail in FIGURES 3 and 4. These plates are made of transparent nonconductive material such as glass or Lucite. Prior to assembly, each of the plates is formed wtih a series of spaced parallel grooves 12, best shown in FIGURE 6 on the outer faces thereof. A plurality of holes 13 are drilled or formed in the plates normal to the faces to accommodate pins 15 which will be inserted later. Each hole 13 is in communication with one of the grooves 12. After the pins 15 have been inserted into the plates, electrically conductive material 16, 17, is deposited in the groove 12. The plates are mounted adjacent to but spaced from each other with the grooves 12 of one plate mounted at 90 degrees to the grooves on the other plate. The space between the plates is filled with a suspension of dipole particles 19. As shown in FIGURE 2, the electrode material 16, 17 on each plate is connected to lead-in conductors 16a for one plate and similar lead-in conductors 17b for the other plate. Pins 15 on one plate are positioned along the length of the electrode conductors 16 and spaced apart a distance which is equal to the spacing of the conductive electrodes on the other plate. This arrangement produces a pattern of pins and electrodes in which each pin 15 on one plate is opposite to a similar pin 15a on the other plate.

Pins 15 and 15a are generally arranged so that they penetrate each plate 10 and 11 for about three-quarters of the plate's thickness. With this construction the pins 15 and 15a are not in contact with the fluid 14 between the plates. This construction is shown in FIGURE 3. There may be some applications where longer pins 21 and 22 are used, these pins traversing the entire thickness of plates 10 and 11 and making contact with the fluid 14 (see FIGURE 4).

Referring now to FIGURE 1, one of the uses of the iris raster is shown. A source of illumination is mounted within a light-tight container 23. The light from this source is focused by a lens 24 onto the raster to provide substantially equal illumination over the entire raster area. An opaque pyramidal covering 25 may be used to maintain the illumination within the desired area. All the lead-in conductors 16a from one edge of the raster are collected within a cable 26 and connected to a source of variable voltage pulses 27. Also, the other lead-in conductors 17a are collected in a cable 28 and connected to a second source of voltages 30. Sources 27 and 30 may be ring counters or any other type of voltage applicators which sequentially apply voltages to predetermined lead-in conductor pairs to control the alignment of the dipoles 19 and the consequent transmisison of light.

It is obvious that this type of raster can be used for many different purposes, one of them being the showing of a television picture. When a television picture is to be shown, the lead-in conductors in cable 28 receive a substantial voltage pulse in sequence which starts from the left hand edge and moves to the right hand edge in synchronism with the received television signal. During each horizontal application of pulses, the conductors connected to cable 26 are energized by circuit 27. During the next horizontal application of pulses, the next lower lead-in conductor is energized by circuit 27. As the process continues, a complete pattern of the entire raster is energized, and at the end of the frame frequency, all the pin pairs where light is to be transmitted or displayed will then have received voltage pulses which establish an electrostatic field between them thereby aligning the dipoles 19 in those areas.

A threshold voltage is preferably established across the pins 15, and 15a by applying an alternating voltage of the order of 100 to 1,000 volts to pins 15 and 15a. This voltage is the minimum critical voltage above which the dipoles start to align evenly, thus forming circular dots of transmitted light between the pins 15, and 15a. Upon the application of the additional voltage from the television scansion, the dipoles in the selected areas within the suspension 14, will locally align to form a small transparent circular area permitting light to pass through the raster at that place. When the voltage is removed, the dipoles 19 will disorient to form an opaque or reflecting nontransmitting screen.

The dipole particles in fluid 14 may be elongated flat or rod-like metal crystals or optically active dichroic crystals, such as Herapathite crystals, having the aforementioned dimensions. A suspension of conductive dipoles or dielectric dipoles align parallel to the electric field direction. Such a dipole suspension employed in a raster according to this invention, presents a visible image of the signal applied to the scansion circuits.

FIGURE 3 shows one example of a dipole control where a pin 15′ is provided with an electric potential and its opposite pin 15a′ is provided with the opposite potential.

As stated above, the application of direct current potential generally produces an ionization layer which tends to mask the effect, however, the application of an alternating current potential to pins 15′ and 15a′ results in the formation of an alternating electrostatic field shown at area 31 in which area the dipoles aligned parallel to electric field lines thereby causing a minimum absorption and/or reflective light normally incident upon plates 10 or 11. The dipole particles external to area 31 are maintained in random angular position by the Brownian movements of the molecules in the fluid 14, and because of this random angular distribution, these areas are more or less opaque to light.

Referring now to FIGURE 4, the raster shown is similar to the raster shown in FIGURE 3 except that the pins 21 and 22 penetrate for the entire thickness of plates 10 and 11 and are therefore in contact with the fluid 14 between the plates. This disposition of the pins results in a more concentrated electrostatic field and permits the pins to be mounted in closer proximity. The shielding field produced by an ionic layer cannot form because an electric current through these exposed pins sweeps the ions away. This current in some cases causes electrolysis, but can be minimized using highly nonconductive fluids as a suspending medium and solid particles not readily disposed to form ions. An example is platinum dipole crystal needles in silicone. The operation is the same.

FIGURE 5 is an alternate view showing plates 10 and 11 mounted in front of a ground glass plate 32 which is positioned here for distributing incident light and for equalizing the illumination over the entire area of plates 10 and 11. Behind the ground glass 32 is a gaseous discharge lamp 33 which may be constructed in a multiple grid array to provide equal illumination over the desired area. Alternatively an electroluminescent sheet can be used to provide a large area of uniform illumination. Such a construction permits a television viewing screen having a very small depth, which can be mounted on a wall or in any other position which does not require the usual extensive depth necessary for the modern conical television cathode ray tube.

It is obvious that the raster 10 may be put to many other uses exclusive of a television screen. Areas in the screen may be made transparent by the application of the proper voltages to transmit various symbols such as figures, letters, or any other type of symbol which may communicate a desired bit of information. It is also obvious that many other types of voltage applicators may be used instead of the applicators 27 and 30 shown in FIGURE 1. These circuits may be responsive to other control signals for showing other symbols, characters, and picture areas.

Having thus fully described the invention, what is claimed as new and desired to be secured by Letters Patent of the United States, is:

1. A multiple iris raster comprising; a first transparent nonconductive plate forming one boundary of the raster, a second transparent nonconductive plate uniformly spaced from the first plate and forming the other boundary of the raster, a nonconductive transparent fluid held between said first and second plates, a plurality of dipole particles in said fluid, a plurality of spaced parallel conductive electrodes secured to said first plate with means for connection to an external circuit, a plurality of spaced parallel conductive electrodes secured to said second plate and perpendicular to the electrodes secured to said first plate with means for connection to an external circuit, and a plurality of conductive pins secured in the first and second plates, each of said pins positioned along said electrodes and in contact therewith, each of said pins mounted normal to the surface of said plates and each pin in one plate mounted opposite to a pin in the other plate.

2. A raster as claimed in claim 1 wherein said dipole particles have a length which is about ⅓ wavelength of visible light and a diameter which is less than ⅟₃₀ of said wavelength.

3. A raster as claimed in claim 1 wherein said pins extend only part of the distance through the plates and are not in contct with said fluid.

4. A raster as claimed in claim 1 wherein said pins extend all the way through the plates and make contact with the fluid between the plates.

5. A raster as claimed in claim 1 wherein said first and second plates are substantially flat and parallel to each other and thereby define a fluid chamber having parallel surfaces.

6. A raster as claimed in claim 1 wherein said dipole particles are made of metal.

7. A raster as claimed in claim 1 wherein said dipole particles are elongated substantially; optically active dichroic crystals formed by precipitation from a liquid solution.

8. A raster as claimed in claim 1 wherein said electrodes are mounted adjacent to the outer surfaces of the plates.

9. A raster as claimed in claim 1 wherein said pins are spaced along said electrodes at a distance equal to the distance between the electrodes on the other plate.

10. A raster as claimed in claim 1 wherein said fluid between the plates is a liquid.

11. A raster as claimed in claim 1 wherein said fluid between the plates is a gas.

12. A raster as claimed in claim 7 wherein said dipole particles are made of Herapathite.

References Cited

UNITED STATES PATENTS

| 3,257,903 | 6/1966 | Marks | 88—61 |
| 3,341,826 | 9/1967 | Lee | 340—173 |

RONALD L. WIBERT, *Primary Examiner.*

P. K. GODWIN, *Assistant Examiner.*

U.S. Cl. X.R.

350—267